United States Patent
Zheng et al.

(10) Patent No.: US 9,229,430 B2
(45) Date of Patent: Jan. 5, 2016

(54) DEVICE FOR RECORDING AND REPRODUCING HOLOGRAPHIC 3D IMAGE, AND METHOD FOR RECORDING AND REPRODUCING HOLOGRAPHIC 3D IMAGE

(71) Applicants: BOE Technology Group Co., Ltd., Beijing (CN); Beijing BOE Display Technology Co., Ltd., Beijing (CN)

(72) Inventors: Xiaoyi Zheng, Beijing (CN); Junwei Wang, Beijing (CN); Xiaopeng Cui, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 50 days.

(21) Appl. No.: 14/138,900

(22) Filed: Dec. 23, 2013

(65) Prior Publication Data

US 2014/0198360 A1 Jul. 17, 2014

(30) Foreign Application Priority Data

Jan. 17, 2013 (CN) .......................... 2013 1 0017726

(51) Int. Cl.
*G03H 1/02* (2006.01)
*G03H 1/04* (2006.01)
(Continued)

(52) U.S. Cl.
CPC ................. *G03H 1/265* (2013.01); *G03H 1/02* (2013.01); *G03H 1/04* (2013.01); *G03H 1/041* (2013.01);
(Continued)

(58) Field of Classification Search
CPC .................. G03H 1/265; G03H 1/041; G03H 2001/0268; G03H 2210/30; G03H 2223/17; G03H 2260/54; G03H 1/00; G03H 1/04; G03H 1/02; G03H 2001/0413; G03H 2001/0415; G03H 2001/0417; G03H 2001/0439; G03H 1/0465; G11B 7/0065
USPC ................. 359/1, 3, 8, 10, 21–25, 28–30, 35; 430/1–2; 369/99–100, 103, 109.01
See application file for complete search history.

(56) References Cited

U.S. PATENT DOCUMENTS

2002/0018429 A1* 2/2002 Xu et al. ........................ 369/103
2007/0109618 A1* 5/2007 Tsukagoshi et al. ............ 359/11
(Continued)

FOREIGN PATENT DOCUMENTS

| CN | 101290781 A | 10/2008 |
|---|---|---|
| CN | 102436170 A | 5/2012 |
| CN | 202443250 U | 9/2012 |

OTHER PUBLICATIONS

First Office Action for Chinese Patent Application No. 201310017726.1, dated Dec. 3, 2014, 16 pages.
Third Office Action for Chinese Patent Application No. 201310017726.1, dated Sep. 1, 2015, 8 pages.

*Primary Examiner* — Scott J Sugarman
*Assistant Examiner* — Alberto Betancourt
(74) *Attorney, Agent, or Firm* — Westman, Champlin & Koehler, P.A.

(57) ABSTRACT

Devices and methods for recording and reproducing a holographic 3D image are provided. The devices for recording the holographic 3D image comprising: a laser generation unit for emitting a laser beam; a beam splitter unit configured to receive the laser beam from the laser generation unit and split the laser beam into a reference beam and an object beam directed to an object to be photographed; a photorefractive crystal configured to receive the reference beam from the beam splitter and the object beam diffused from the object to form a holographic 3D image; and a rotation unit configured to rotate the photorefractive crystal once every time one holographic 3D image is recorded. The holographic 3D image can be recorded and reproduced by the rotate the photorefractive crystal in light paths of recording and reproduction light beams, respectively.

13 Claims, 2 Drawing Sheets

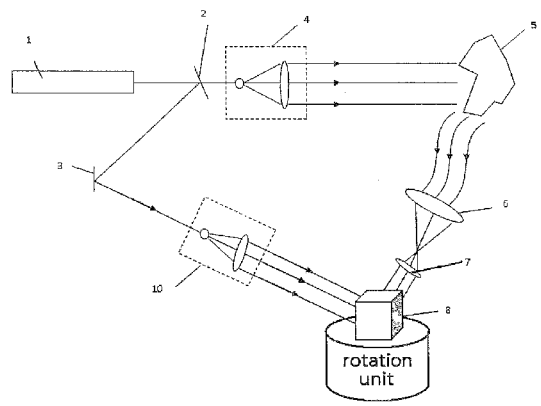

(51) Int. Cl.
*G11B 7/0065* (2006.01)
*G03H 1/26* (2006.01)

(52) U.S. Cl.
CPC .... *G03H 2001/0268* (2013.01); *G03H 2210/30* (2013.01); *G03H 2223/17* (2013.01); *G03H 2260/54* (2013.01); *G11B 7/0065* (2013.01)

(56) References Cited

U.S. PATENT DOCUMENTS

2012/0002257 A1* 1/2012 Shirakura et al. ............... 359/22
2012/0188358 A1* 7/2012 Kimura ........................... 348/79

* cited by examiner

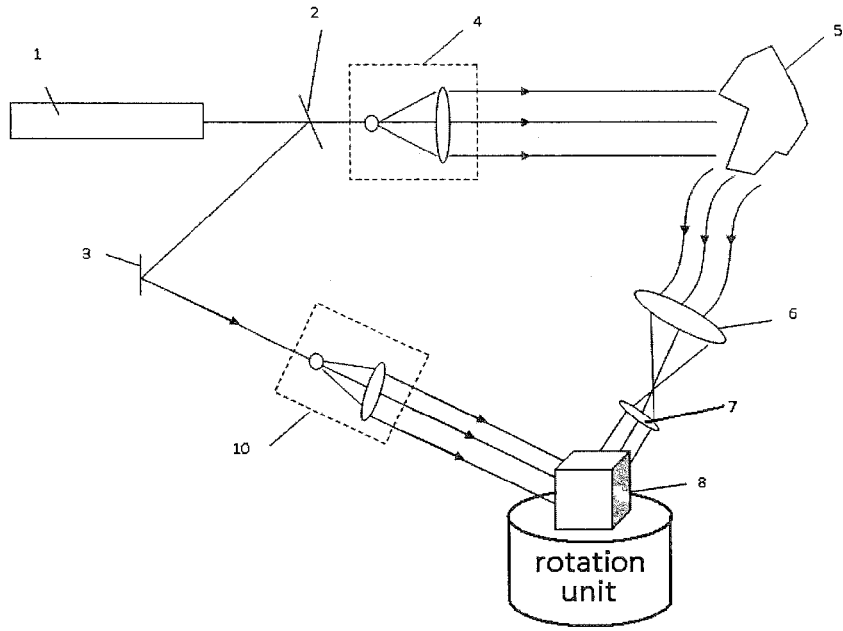

Fig. 1 constructing holographic recording light path comprising light path of reference beam directed to photorefractive crystal and light path of object beam directed to object to be photographed and then to the photorefractive crystal — S201 recording one holographic 3D image on photorefractive crystal by means of holographic recording light path — S202 rotating photorefractive crystal by predetermined angle to record next one holographic 3D image on photorefractive crystal by means of holographic recording light path — S203

Fig. 2

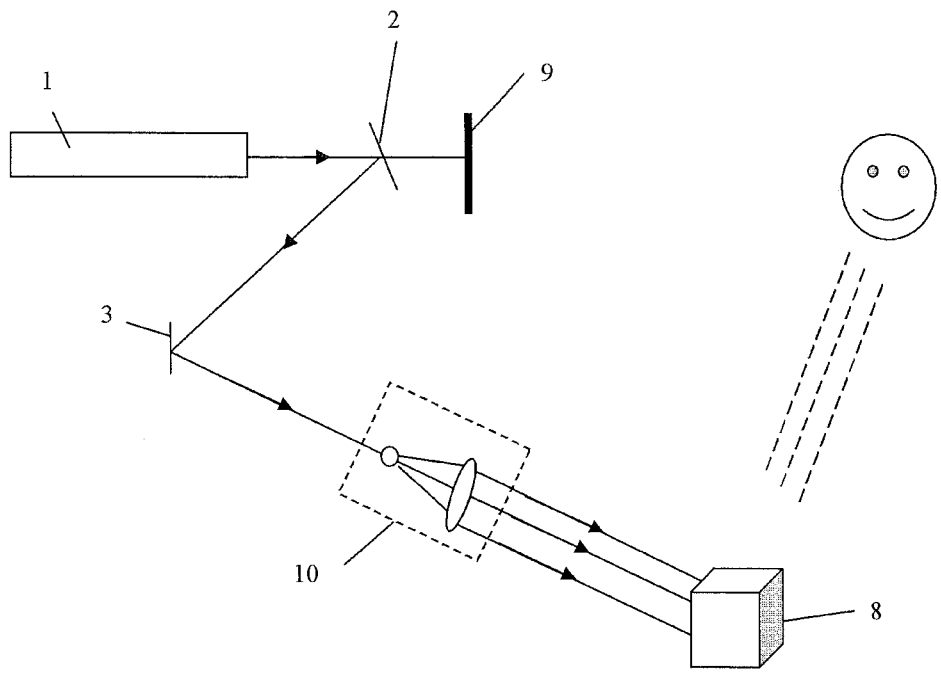

Fig. 3

| setting light path of reference beam as light path of reproduction light beam and blocking object beam directed to object, wherein photorefractive crystal is recorded with a plurality of holographic 3D images at a plurality of different angles | S401 |

| reproducing respective holographic 3D image in a direction in which object beam is directed to photorefractive crystal during recording holographic 3D image | S402 |

| rotating photorefractive crystal by predetermined angle and reproducing holographic 3D image corresponding to rotated photorefractive crystal | S403 |

Fig. 4

DEVICE FOR RECORDING AND REPRODUCING HOLOGRAPHIC 3D IMAGE, AND METHOD FOR RECORDING AND REPRODUCING HOLOGRAPHIC 3D IMAGE

CROSS-REFERENCE TO RELATED APPLICATION

This application claims the benefit of Chinese Patent Application No. 201310017726.1 filed on Jan. 17, 2013 in the State Intellectual Property Office of China, the whole disclosure of which is incorporated herein by reference.

BACKGROUND OF THE INVENTION

1. Field of the Invention

The present invention relates to a technical field of a display, more particularly, relates to a device for recording a holographic 3D image, a device for reproducing a holographic 3D image, a method for recording a holographic 3D image, and a method for reproducing a holographic 3D image.

2. Description of the Related Art

In a linear optical material, such as lens, prism, etc., a light beam may pass through the linear optical material and cannot change an inherent property of the linear optical material. A light induced refractive index change effect, often simply called as a photorefractive effect, is referred to an effect that an electric charge field is induced due to a photoelectric effect when an optical material is irradiated by light and a refractive index of the optical material is changed with a spatial intensity distribution of light under the photoelectric effect. However, the photorefractive effect generally is not limited to the light induced refractive index change. Since the optical property of the optical material having the photorefractive effect can be changed by the light passing through the optical material, the optical material is a non-linear optical material. On one hand, such optical material has photorefractive crystals that can record a complicated optical image like a conventional film sensitizer used in a camera. On the other hand, such optical material having the photorefractive effect can be reused because the image recorded on the optical material can be removed, while the conventional film cannot be reused after exposed because the image recorded on the film cannot be removed, therefore, such optical material is superior to the film. One of important advantages of the photorefractive crystal is that the photorefractive crystal can store about 5000 different images in a volume of about 3 cm$^3$ and can rapidly display any one of the images.

A holography of light wave comprises all information of it, including vibration amplitude and phase information. A normal photography only can record the intensity information (vibration amplitude information) of the light wave and omit the phase information of the light wave. The holography can record all information (vibration amplitude and phase information) of an original object light wave in a record medium based on interference principle. Furthermore, when the record medium is illuminated by a reproduction light wave, the original object light wave can be reproduced based on diffraction principle, achieving the reproduction of a vivid 3D image.

Since the 3D effect of the image reproduced by the holography is very strong, the 3D display technology based on the holography is becoming popular. The holography 3D display technology mainly comprises synthetic holography 3D display, digital holography 3D display and erasable material-based holography 3D display.

SUMMARY OF THE INVENTION

The present invention has been made to overcome or alleviate at least one aspect of the above mentioned disadvantages.

Accordingly, it is an object of the present invention to provide a device for recording and reproducing a holographic 3D image and a method for recording and reproducing a holographic 3D image that can simply and rapidly record and reproduce a plurality of holographic 3D images without changing a light path structure of the device.

According to a first aspect of the present invention, there is provided a device for recording a device for recording a holographic 3D image, comprising:

a laser generation unit for emitting a laser beam;

a beam splitter unit configured to receive the laser beam from the laser generation unit and split the laser beam into a reference beam and an object beam directed to an object to be photographed;

a photorefractive crystal configured to receive the reference beam from the beam splitter unit and the object beam diffused from the object to form a holographic 3D image; and a rotation unit configured to rotate the photorefractive crystal once every time one holographic 3D image is recorded.

According to a second aspect of the present invention, there is provided a method for recording a holographic 3D image, comprising steps of:

constructing a holographic recording light path comprising a light path of a reference beam directed to a photorefractive crystal and a light path of an object beam directed to an object to be photographed and then directed to the photorefractive crystal;

recording one holographic 3D image on the photorefractive crystal by means of the holographic recording light path; and rotating the photorefractive crystal by a predetermined angle to record next one holographic 3D image on the photorefractive crystal by means of the holographic recording light path.

According to a third aspect of the present invention, there is provided a device for reproducing a holographic 3D image, comprising:

a photorefractive crystal configured to be recorded with a plurality of holographic 3D images at a plurality of different angles;

a laser generation unit for emitting a laser beam, wherein at least a portion of the laser beam is served as a reproduction light beam and illuminated on the photorefractive crystal; and a rotation unit connected to the photorefractive crystal and configured to rotate the photorefractive crystal by a angle corresponding to a holographic 3D image to be reproduced.

According to a fourth aspect of the present invention, there is provided a method for reproducing a holographic 3D image recorded by the above method for reproducing a holographic 3D image, comprising steps of:

setting the light path of the reference beam as a light path of a reproduction light beam and blocking the object beam directed to the object, wherein the photorefractive crystal is recorded with a plurality of holographic 3D images at a plurality of different angles;

reproducing the respective holographic 3D image in a direction in which the object beam is directed to the photorefractive crystal during recording the holographic 3D image;

rotating the photorefractive crystal by the predetermined angle and reproducing the holographic 3D image corresponding to the rotated photorefractive crystal.

According to a fifth aspect of the present invention, there is provided a method for reproducing a holographic 3D image, comprising steps of:

constructing a reproduction light path directed to a photorefractive crystal, wherein the photorefractive crystal is recorded with a plurality of holographic 3D images at a plurality of different angles;

reproducing the respective holographic 3D image in a direction in which the object beam is directed to the photorefractive crystal during recording the holographic 3D image; and rotating the photorefractive crystal by a predetermined angle and reproducing the holographic 3D image corresponding to the rotated photorefractive crystal.

BRIEF DESCRIPTION OF THE DRAWINGS

The above and other features of the present invention will become more apparent by describing in detail exemplary embodiments thereof with reference to the accompanying drawings, in which:

FIG. 1 is an illustrative structure view of a device for recording a holographic 3D image according to an exemplary embodiment of the present invention;

FIG. 2 is a flow chart of a method for recording a holographic 3D image according to an exemplary embodiment of the present invention;

FIG. 3 is an illustrative structure view of a device for reproducing a holographic 3D image according to an exemplary embodiment of the present invention; and FIG. 4 is a flow chart of a method for reproducing a holographic 3D image according to an exemplary embodiment of the present invention.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

According to a general concept of the present invention, there is provided a device for recording a holographic 3D image, comprising:

a laser generation unit for emitting a laser beam;

a beam splitter unit configured to receive the laser beam from the laser generation unit and split the laser beam into a reference beam and an object beam directed to an object to be photographed;

a photorefractive crystal configured to receive the reference beam from the beam splitter unit and the object beam diffused from the object to form a holographic 3D image; and a rotation unit configured to rotate the photorefractive crystal once every time one holographic 3D image is recorded.

In the recording device of the present invention, a plurality of holographic 3D images can be simply and rapidly recorded by rotating the photorefractive crystal.

FIG. 1 is an illustrative structure view of a device for recording a holographic 3D image according to an exemplary embodiment of the present invention. In an exemplary embodiment, as shown in FIG. 1, the recording device mainly comprises a laser generation unit 1, a beam splitter unit 2, a photorefractive crystal 8 and a rotation unit.

The laser generation unit is used to emit a laser beam. In an exemplary embodiment, the laser beam may comprise a high coherent monochrome laser.

The beam splitter unit 2 is configured to receive the laser beam from the laser generation unit 1 and split the laser beam into a reference beam and an object beam led to an object 5 to be photographed. In an exemplary embodiment, the beam splitter unit 2 is configured as a semi-reflection and semi-transparent beam splitter lens that can split an incident laser beam into a reflection beam with an angle and a transmission beam at a proper ratio of, for example, 1:1. In the illustrated embodiment, the reflection beam functions as the reference beam, and the transmission beam functions as the object beam. It should be appreciated for those skilled in this art that the present invention may adopt other optical element to split the laser beam in addition to the above beam splitter lens.

The photorefractive crystal 8 is configured to record an interference pattern occurred when the reference beam meets the object beam, and form the holographic 3D image.

The rotation unit (not shown in FIG. 1) is configured to synchronously rotate the photorefractive crystal 8 once every time one holographic 3D image is recorded. In an exemplary embodiment, the rotation unit may be a rotatable carrier, and the photorefractive crystal 8 is placed on the rotatable carrier and rotated with the rotatable carrier. In another exemplary embodiment, the rotation unit may be configured to rotate the photorefractive crystal 8 once after one holographic 3D image is recorded and before next one holographic 3D image is recorded.

In an exemplary embodiment, the recording device may further comprise a first beam expand-collimating assembly 4 disposed in a light path between the beam splitter unit 2 and the object 5 and configured to expand and collimate the object beam emitted from the beam splitter unit 2 so as to form a parallel incident beam on the surface of the object 5 to be photographed. The object 5 diffuses the object beam from the first beam expand-collimating assembly 4 to form a diffused object beam.

In an exemplary embodiment, the recording device may further comprise at least one light spot control unit. In an exemplary embodiment, the light spot control unit may comprise a large aperture lens 6 and a small aperture lens 7 having an aperture less than that of the large aperture lens 6. A focus of the large aperture lens 6 and a focus of the small aperture lens 7 are coincided with each other between the large aperture lens 6 and the small aperture lens 7. The object beam diffused by the object 5 is converged to the focus of the large aperture lens 6 coincided with the focus of the small aperture lens 7, and the object beam converged by the large aperture lens 6 passes through the small aperture lens 7 and becomes a narrow parallel beam which is illuminated on the photorefractive crystal 8. It should be appreciated for those skilled in this art that a light spot control unit may be disposed in a light path of the reference beam to adjust a size of a light spot formed on the photorefractive crystal 8 by the reference beam, so that the light spots foamed on the photorefractive crystal 8 by the reference beam and the object beam are substantially equivalent to each other in size. In an alternative embodiment, the light spot control unit may be disposed in both the light paths of the object beam and the reference beam to control both the sizes of the light spots of the object beam and the reference beam.

In an exemplary embodiment, the recording device may further comprise a mirror 3 disposed in a light path between the beam splitter unit 2 and the photorefractive crystal 8 and configured to reflect the reference beam emitted from the beam splitter unit 2 toward the photorefractive crystal 8. In an exemplary embodiment, the mirror 3 may be located in a proper position, so that an optical path of the object beam and an optical path of the reference beam from the beam splitter unit 2 to photorefractive crystal 8 may be substantially equal to each other.

In an exemplary embodiment, the recording device may further comprise a second beam expand-collimating assembly 10 disposed in a light path between the mirror 3 and the photorefractive crystal 8 and configured to expand and collimate the reference beam reflected from the mirror 3 to the photorefractive crystal 8 so as to form a parallel beam (a plane light wave) illuminated on the photorefractive crystal 8.

In an exemplary embodiment, in the holographic 3D image recording device, in order to produce a complete and high quality of holographic 3D image, the object beam and the reference beam each forms a complete light spot on the photorefractive crystal 8. In another exemplary embodiment, the light spot is located within the boundary of the photorefractive crystal 8, and the light spots formed on the photorefractive crystal 8 by the reference beam and the object beam have substantially the same size.

If it is difficult to control the light spots formed by the reference beam and the object beam to have substantially the same size by means of selecting the lenses in the first and second beam expand-collimating assemblies and the large and small aperture lenses 6 and 7, the light spot control unit may further comprise a small aperture stop (diaphragm). In this way, the sizes of the light spots can be controlled by the small aperture stops disposed in the light paths of the object beam and the reference beam.

In an exemplary embodiment, the recording device can simply and rapidly record different holographic 3D images by rotating the photorefractive crystal 8 by an angle without changing the structure of the light path of the recording device. As a result, a set of holographic 3D images indicating all orientation information of the object can be obtained by rotating the photorefractive crystal 8 to different angle positions, so that a holographic 3D dynamic display can be achieved during reproducing the set of holographic 3D images.

FIG. 2 is a flow chart of a method for recording a holographic 3D image according to an exemplary embodiment of the present invention.

As shown in FIG. 2, the method for recording the holographic 3D image comprising steps of:

S201: constructing a holographic recording light path comprising a light path of a reference beam directed to a photorefractive crystal and a light path of an object beam directed to an object to be photographed and then to the photorefractive crystal, wherein the object beam and the reference beam may comprise a coherent light;

S202: recording one holographic 3D image on the photorefractive crystal by means of the holographic recording light path; and S203: rotating the photorefractive crystal by a predetermined angle to record a next holographic 3D image on the photorefractive crystal by means of the holographic recording light path, while the structure of the holographic recording light path being unchanged.

In an exemplary embodiment of the recording method, the photorefractive crystal may be synchronously rotated once every time an angle of the object to be photographed is changed once. As a result, a set of holographic 3D images indicating all orientation information of the object can be obtained by rotating the photorefractive crystal 8 to different angle positions. In an alternative embodiment, after rotating the photorefractive crystal by a preset angle, next one holographic 3D image is recorded on the photorefractive crystal by the holographic recording light path. It should be appreciated for those skilled in this art that the photorefractive crystal should be correspondingly rotated in a case where it needs to capture a new holographic 3D image at the time of, for example, replacing the object to be photographed.

In an exemplary embodiment of the method for recording the holographic 3D image, the holographic recording light path may be constructed by the device for recording the holographic 3D image according to the above various embodiments; and the photorefractive crystal may be rotated by the preset angle by means of the rotation unit.

According to another general concept of the present invention, there is provided a device for reproducing or displaying a holographic 3D image, comprising:

a photorefractive crystal configured to be recorded with a plurality of holographic 3D images at a plurality of different angles;

a laser generation unit for emitting a laser beam, wherein at least a portion of the laser beam is served as a reproduction light beam and directed on the photorefractive crystal; and a rotation unit connected to the photorefractive crystal and configured to rotate the photorefractive crystal by a angle corresponding to a holographic 3D image to be reproduced.

In an exemplary embodiment of the reproducing device, in order to improve the image display effect, the reproduction light beam may be set as an original reference beam used in recording the holographic 3D image or a light beam substantially equivalent to the reference beam in wave, vibration amplitude, vibration frequency and incident angle.

The reproducing device of the present invention can simply and rapidly display or reproduce a plurality of holographic 3D images by rotating the photorefractive crystal.

FIG. 3 is an illustrative structure view of a device for reproducing a holographic 3D image according to an exemplary embodiment of the present invention.

In an exemplary embodiment, as shown in FIG. 3, the reproducing device may be achieved by removing the object 5 from the above device for recording the holographic 3D image and adding a light blocking plate 9 at a side of the beam splitter unit 2 from which the object beam is emitted. That is, the light path of the reference beam constructed by the laser generation unit 1, the mirror 3 and the second beam expand-collimating assembly 10 in the device for recording the holographic 3D image of FIG. 1 may be adopted as the light path of the reproduction light beam of the device for reproducing the holographic 3D image. In this way, the reproducing and recording the holographic 3D image can be simply achieved only by adopting the light path formed by the recording device of FIG. 1. But the present invention is not limited to this, it should be appreciated for those skilled in this art that the holographic 3D image recorded on photorefractive crystal 8 may be simply reproduced in a direction of the object beam, used during recording the holographic 3D image, with a respective angle as long as a light beam having the same angle and the same intensity as those of the reference beam is radiated on the photorefractive crystal 8. That is, the reproducing device of the present invention may be constructed by another laser generation unit, another beam splitter unit, another photorefractive crystal and another rotation unit independent of those in the recording device of FIG. 1.

When the rotation unit (not shown in FIG. 3) rotates the photorefractive crystal 8 in a direction identical to or opposite to a direction in which the photorefractive crystal 8 is rotated during recording the holographic 3D images, the holographic 3D images of the object 5 recorded on the photorefractive crystal 8 at different angles can be reproduced one by one, and an observer can see a set of rotating holographic 3D images indicating all orientation information of the object.

In another exemplary embodiment, if the reproduced or displayed holographic 3D image of the object is small or has many complicated details, a set of functional lenses may be provided between the observer and the photorefractive crystal 8 to enlarge the reproduced image and facilitate the observer to clearly see it.

FIG. 4 is a flow chart of a method for reproducing a holographic 3D image according to an exemplary embodiment of the present invention.

As shown in FIG. 4, the method is used for reproducing the holographic 3D image recorded by the above method for recording the holographic 3D image, and comprises steps of:

S401: setting the light path of the reference beam as a light path of a reproduction light beam and blocking the object beam led to the object, wherein the photorefractive crystal is recorded with a plurality of holographic 3D images at a plurality of different angles;

S402: reproducing the respective holographic 3D image in a direction in which the object beam is led to the photorefractive crystal during recording the holographic 3D image; and S403: rotating the photorefractive crystal by the predetermined angle and reproducing or displaying the holographic 3D image corresponding to the rotated photorefractive crystal, while the structure of a holographic displaying light path being unchanged.

In an exemplary embodiment of the reproducing or displaying method, the light path of the reproduction light beam is constructed by the above device for recording the holographic 3D image, and the photorefractive crystal is rotated by a predetermined angle by the rotation unit.

In an exemplary embodiment of the method of reproducing or displaying the holographic 3D image, the light path of the reference beam constructed by the laser generation unit 1, the mirror 3 and the second beam expand-collimating assembly 10 in the recording device of FIG. 1 may be adopted as the light path of the reproduction light beam. In this way, the recording and reproducing of the holographic 3D image can be simply achieved only by adopting the light path of the reference beam of the recording device of FIG. 1.

A method for reproducing a holographic 3D image according to another exemplary embodiment of the present invention, comprising steps of:

constructing a holographic reproduction light path directed to a photorefractive crystal, wherein the photorefractive crystal is recorded with a plurality of holographic 3D images at a plurality of different angles;

reproducing the respective holographic 3D image in a direction in which the object beam is directed to the photorefractive crystal during recording the holographic 3D image; and rotating the photorefractive crystal by a predetermined angle and reproducing the holographic 3D image corresponding to the rotated photorefractive crystal.

In an exemplary embodiment of the reproducing method, the holographic reproduction light path may be constructed by another laser generation unit, another beam splitter unit, another mirror and another second beam expand-collimating assembly independent of those in the recording device of FIG. 1. As a result, the respective holographic 3D image recorded on photorefractive crystal 8 may be simply reproduced in a direction of the object beam, used during recording the holographic 3D image, at the respective angle.

According to another general concept of the present invention, there is provided a device for achieving the holographic 3D image comprising the above device for recording the holographic 3D image and the above device for reproducing the holographic 3D image. In an exemplary embodiment, the device for reproducing the holographic 3D image may be achieved by removing the object 5 from the above device for recording the holographic 3D image and adding a light blocking plate 9 at a side of the beam splitter unit 2 from which the object beam is emitted. That is, the light path of the reference beam constructed by the laser generation unit 1, the mirror 3 and the second beam expand-collimating assembly 10 in the device for recording the holographic 3D image of FIG. 1 may be adopted as the light path of the reproduction light beam of the device for reproducing the holographic 3D image. In an alternative embodiment, the reproducing device of the present invention may be constructed by another laser generation unit, another beam splitter unit, another photorefractive crystal and another rotation unit independent of those in the recording device of FIG. 1.

In the present invention, a plurality of holographic 3D images can be recorded and reproduced simply by rotating the photorefractive crystal in the light paths of recording and displaying the holographic 3D image. As a result, a set of holographic 3D images indicating all orientation information of the object can be continuously recorded on the photorefractive crystal at different angles by means of the device and method for recording the holographic 3D image. When it needs to reproduce the holographic 3D images recorded on the photorefractive crystal, the photorefractive crystal is rotated in the reproduction light beam by means of the device and method for reproducing the holographic 3D image, and the holographic 3D images recorded on the photorefractive crystal can be reproduced without interference with each other. In this way, by rotating the photorefractive crystal, the 3D images of the object photographed at various angles can be displayed at the back side of the photorefractive crystal, achieving the holographic 3D dynamic display effect.

The devices for recording and reproducing the holographic 3D image of the present invention may be widely applied at museum, auction, etc., facilitating the persons on the spot to really experience various characterizes, such as, size, shape, etc., of the object, and avoiding the risk that the object is damaged or stolen when the object is directly displayed on the spot.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A device for recording a holographic 3D image, comprising:
   a laser generation unit for emitting a laser beam;
   a beam splitter unit configured to receive the laser beam from the laser generation unit and split the laser beam into a reference beam and an object beam directed to an object to be photographed;
   a photorefractive crystal configured to receive the reference beam from the beam splitter unit and the object beam diffused from the object to form the holographic 3D image;

a rotation unit configured to rotate the photorefractive crystal once every time one holographic 3D image is recorded; and a light spot control unit disposed in light paths of the object beam between the beam splitter unit and the photorefractive crystal and configured to adjust a size of a light spot formed on the photorefractive crystal by the object beam, wherein the light spot control unit comprises a large aperture lens and a small aperture lens having an aperture less than that of the large aperture lens, a focus of the large aperture lens and a focus of the small aperture lens are coincided with each other, the object beam diffused by the object is converged to the coincided focus by the large aperture lens, and formed as a narrow parallel beam, which is illuminated on the photorefractive crystal, by the small aperture lens.

2. The device according to claim 1, further comprising:
a mirror disposed in a light path between the beam splitter unit and the photorefractive crystal and configured to reflect the reference beam emitted from the beam splitter unit toward the photorefractive crystal.

3. The device according to claim 1, further comprising:
a first beam expand-collimating assembly disposed in a light path between the beam splitter unit and the object and configured to expand and collimate the object beam emitted from the beam splitter unit.

4. The device according to claim 2, further comprising:
a second beam expand-collimating assembly disposed in a light path between the minor and the photorefractive crystal and configured to expand and collimate the reference beam reflected from the minor to the photorefractive crystal.

5. The device according to claim 1,
wherein the object beam and the reference beam each forms a complete light spot on the photorefractive crystal.

6. The device according to claim 1,
wherein the light spots formed on the photorefractive crystal by the object beam and the reference beam are substantially equivalent to each other in size.

7. The device according to claim 1,
wherein the light spot control unit comprises a aperture stop.

8. The device according to claim 1,
wherein an optical path of the object beam and an optical path of the reference beam from the beam splitter unit to the photorefractive crystal are substantially equal to each other.

9. The device according to claim 1,
wherein the rotation unit is configured to synchronously rotate the photorefractive crystal once every time one holographic 3D image is recorded, or configured to rotate the photorefractive crystal once after one holographic 3D image is recorded and before a next holographic 3D image is recorded.

10. A method for recording a holographic 3D image, comprising steps of:
constructing a holographic recording light path comprising a light path of a reference beam directed to a photorefractive crystal and a light path of an object beam directed to an object to be photographed and then directed to the photorefractive crystal;

recording one holographic 3D image on the photorefractive crystal by the holographic recording light path; and rotating the photorefractive crystal by a predetermined angle to record a next holographic 3D image on the photorefractive crystal by the holographic recording light path, providing a light spot control unit in the light path of the object bean between a beam splitter unit and the photorefractive crystal and adjusting a size of a light spot formed on the photorefractive crystal by the object beam, wherein the light spot control unit comprises a large aperture lens and a small aperture lens having an aperture less than that of the large aperture lens, a focus of the large aperture lens and a focus of the small aperture lens are coincided with each other, the object beam diffused by the object is converged to the coincided focus by the large aperture lens, and formed as a narrow parallel beam, which is illuminated on the photorefractive crystal, by the small aperture lens.

11. The method according to claim 10,
wherein the photorefractive crystal is synchronously rotated once every time an angle of the object to be photographed is changed once.

12. The method according to claim 10,
wherein the holographic recording light path is constructed by an optical assembly comprising:
a laser generation unit for emitting a laser beam; and
the beam splitter unit configured to receive the laser beam from the laser generation unit and split the laser beam into the reference beam and the object beam directed toward the object to be photographed, and
wherein the photorefractive crystal is rotated by the predetermined angle by means of a rotation unit.

13. A method for reproducing a holographic 3D image recorded by the method of claim 10, comprising steps of:
setting the light path of the reference beam as a light path of a reproduction light beam and blocking the object beam directed to the object, wherein the photorefractive crystal is recorded with a plurality of holographic 3D images at a plurality of different angles;

reproducing the respective holographic 3D image in a direction in which the object beam is directed to the photorefractive crystal during recording the holographic 3D image;

rotating the photorefractive crystal by the predetermined angle and reproducing the holographic 3D image corresponding to the rotated photorefractive crystal.

\* \* \* \* \*